Sept. 20, 1927.
C. E. FULLER
1,642,992
STORAGE CONVEYER
Filed Dec. 20, 1922
2 Sheets-Sheet 1
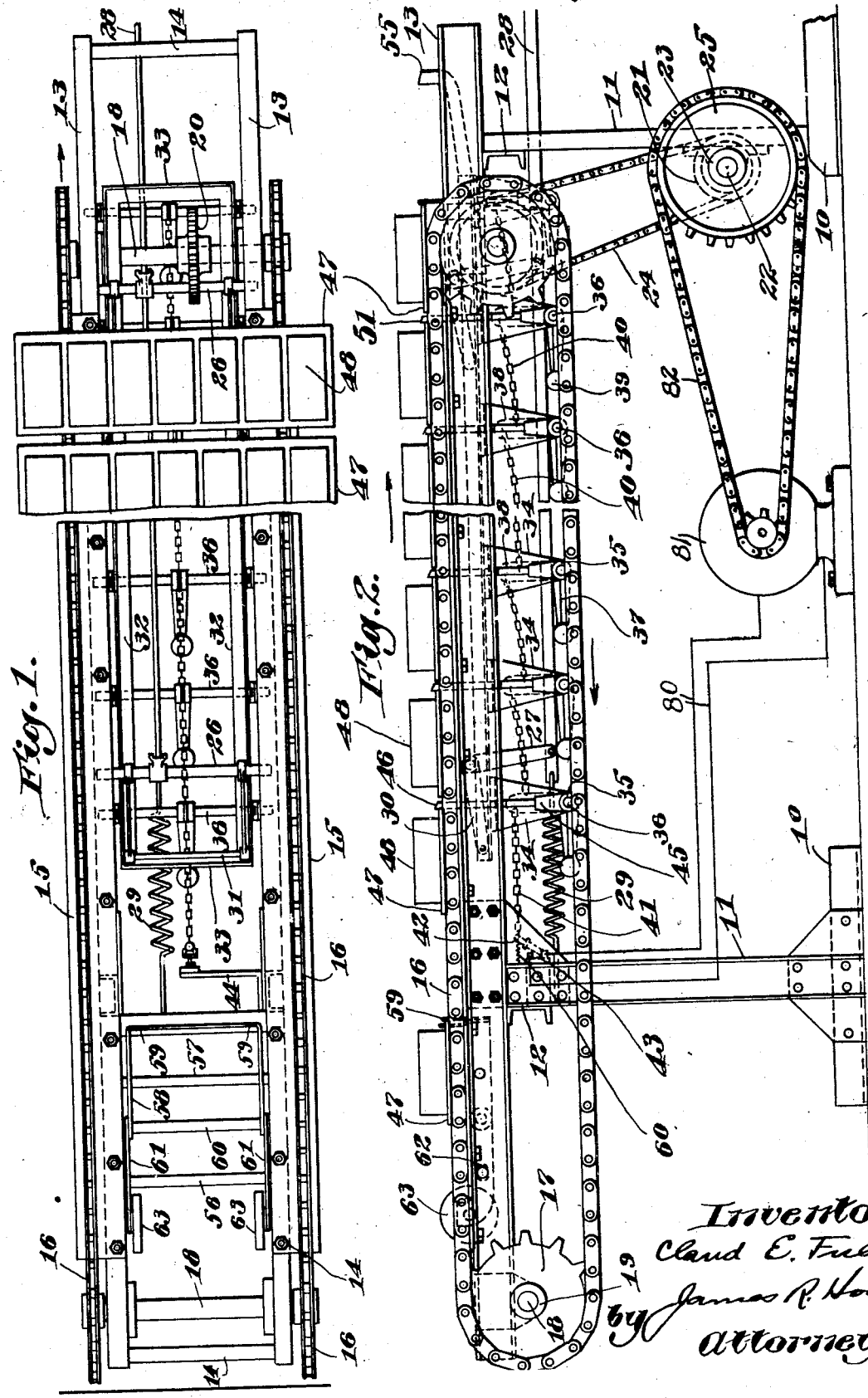

Sept. 20, 1927.  C. E. FULLER  1,642,992
STORAGE CONVEYER
Filed Dec. 20, 1922   2 Sheets-Sheet 2
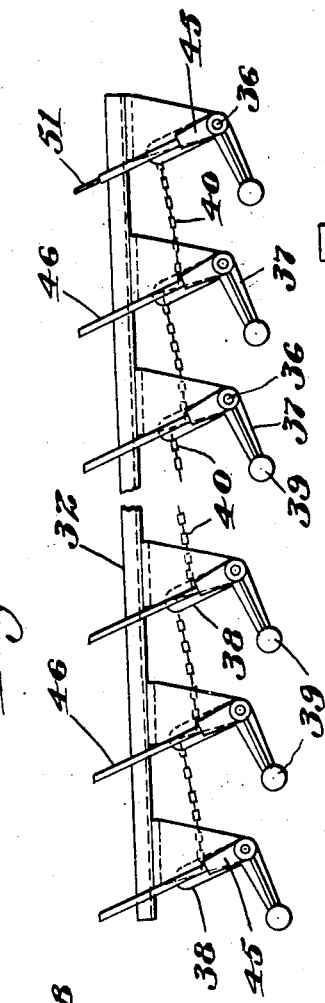
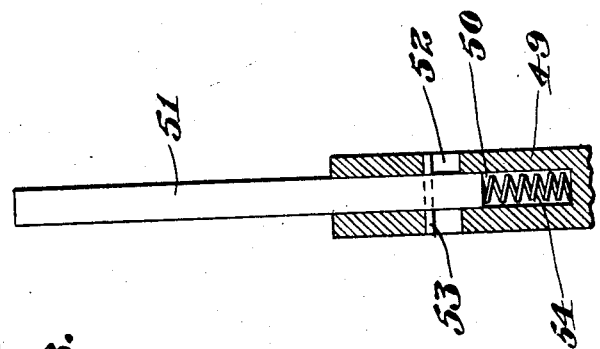
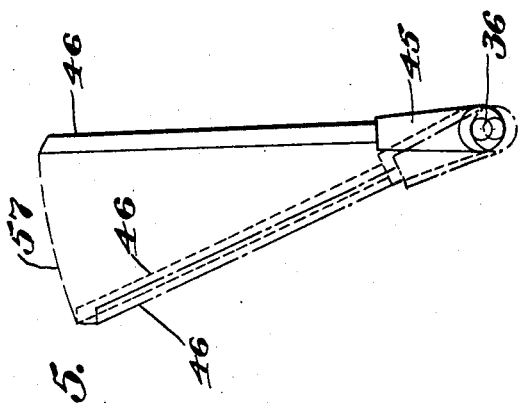
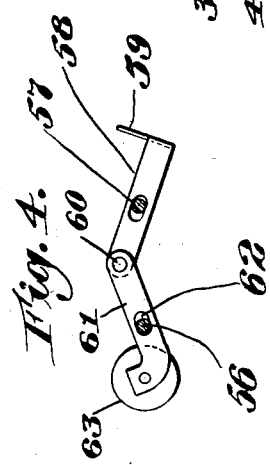
Inventor
Claud E. Fuller
by James R. Hodder
attorney Patented Sept. 20, 1927.

1,642,992

UNITED STATES PATENT OFFICE.

CLAUD E. FULLER, OF NEW YORK, N. Y.

STORAGE CONVEYER.

Application filed December 20, 1922. Serial No. 608,057.

My present invention relates to conveyers, and more particularly to a pallet storage conveyer adapted for use in machines for mechanically handling brick during the manufacture thereof.

In such improved hacking machine, one of the essential features is a conveyer which is employed for conveying the loaded pallets from the drying apparatus to a point in the hacking machine where they are pushed off from the pallets, upedged, and brought into position for subsequent lifting in layers and into position in a unit. To speed up the operation of hacking machines, it is essential that the delivery of loaded pallets to the hacking machine be continuous or as nearly continuous as possible and it is essential, therefore, that some means be provided whereby loaded pallets may be delivered to the hacking machine during such time as is necessarily taken for mechanism to push off from a plurality of pallets the bricks loaded thereon and room made for the placing of further loaded pallets to repeat such operation. In my present invention I have devised a conveyer for loaded pallets which will deliver such loaded pallets in succession to mechanism that will position the same in position to be operated by the pushing-off mechanism, and during the time such pushing-off mechanism is operated, will allow pallets to be stored up during such pushing-off operation and position such pallets for immediate delivery to the mechanism that will bring them into position to be operated on by the pushing means. In connection with such pallet storage conveyer I have provided means which will, when operated normally, allow the continuous operation of the mechanism for feeding the loaded pallets from the drier onto the storage conveyer, but which will, if the mechanism for pushing bricks off the pallets is deranged, automatically shut off the flow of loaded pallets to the storage conveyer from the brick drying apparatus. I have also devised mechanism in connection with my improved pallet storage conveyer which will automatically aline or straighten out each loaded pallet preparatory to its travel over the conveyer, each preceding loaded pallet being allowed to start on its travel over the conveyer by mechanism operated by the succeeding loaded pallet, such portion of the mechanism as is associated with the preceding loaded pallet acting as a means for straightening or alining the loaded pallet with respect to the direction of travel of the conveyer.

In the accompanying drawings illustrating a preferred embodiment of my invention, Fig. 1 is a plan view;
Fig. 2 is a side elevation;
Fig. 3 is a detail of the pallet stopping and controlling mechanism;
Fig. 4 is a detail showing the construction of the pallet alining and releasing mechanism;
Fig. 5 is a detail illustrating the non-operative and operative positions of the pallet stop arms, and
Fig. 6 is a sectional detail view of a portion of the modified stop finger.

Referring to the drawings, 10 designates base frame members having secured thereto uprights 11 tied together and spaced apart at their top by channel iron members 12 of suitable width. Secured to the top of the uprights 11, in any suitable manner, and at each end of the cross members 12, are longitudinally extending channel iron members 13, the ends of these members being secured together by cross bars 14. Secured to the top of each of the side members 13 by bolts 14 are plates 15 which extend substantially throughout the major portion of the length of such side members 13 and outwardly therefrom, such plates forming a supporting runway for endless conveyer chains 16 which conveyer chains ride over sprockets 17 secured to the outer ends of shafts 18 rotatably mounted in depending bearings 19 secured near each end of the side members 13 and on each side of the table or platform defined thereby. Such construction insures that the endless conveyer chains 16 on each side of the table or platform defined by the side members 13 will move at the same surface speed. Secured to the right hand shaft 18, as viewed in Figs. 1 and 2, is a sprocket wheel 20 which is in alinement with a sprocket wheel 21 secured to a shaft 22 rotatably mounted in bearing blocks 23 secured to the right hand standards or uprights 11. Running over the sprocket wheels 20 and 21 is an endless chain 24 and by means of which power is delivered from the shaft 22 to the right hand shaft 18 for moving the endless conveyer chains 16, such conveyer chains moving in the direction of the arrow shown in Figs. 1 and 2. Also secured to the shaft 22 is a sprocket wheel 25 over which passes an endless driving chain 82 from any suitable source of power 81. Rotatably mounted in suitable bearings in the side members 13 and arranged parallel to, but spaced apart from, each other a suitable distance are shafts 26 to each of which is secured, intermediate the ends thereof, a downwardly depending lever 27, the lower ends of these levers 27 being pivotally attached to a horizontally arranged operating bar 28 which extends on the right hand end, as viewed in Fig. 2, to an operating mechanism (not shown) and to the left hand end is secured one end of a coil spring 29, the other end of this spring 29 being secured to a cross member extending between the uprights 11. Secured to each of the shafts 26 near each end thereof and extending outward therefrom in a substantially horizontal direction are arms 30, the outer or free ends of which are pivotally connected to shafts 31 having their ends secured to the side members 32 of a rectangular frame, the side members 32 being tied together at their ends by end members 33. Movement of the operating bar 28 to the right will cause the rectangular frame to be moved downwardly, while yet being maintained horizontal, while a reverse movement, or movement to the left of such operating rod 28, under the influence of the spring 29, will cause an upward movement of said frame while yet maintaining such frame substantially horizontal, as shown in Fig. 2. Secured to the side members 32 of the rectangular frame and extending downwardly therefrom, and on each side thereof, are spaced hangers 34 provided with bearings 35 at their lower end, and in each pair of oppositely arranged hangers 34 is rotatably mounted a shaft 36, each of which has secured thereto a bell crank lever comprised of a substantially horizontally arranged arm 37 and a substantially vertically arranged arm 38, the outer end of the horizontal arm 37 being provided with a weight 39, while to the upper end of each of the vertically arranged arms 38, with the exception of the extreme left hand arm 38, as viewed in Figs. 1 and 2, is secured one end of a chain 40, the other end of such chain being secured to the next vertical arm 38, to the left, as viewed in Figs. 1 and 2, and at a point intermediate the ends thereof. To the upper or free end of the extreme left hand vertically arranged arm 38 is secured one end of a chain 41, the other end of which is secured to the free end of a switch arm 42 of a control switch 43 that is secured on a bracket 44 on one of the uprights 11, as clearly shown in Fig. 1. The switch 43 is connected in the control circuit of a motor 81 by cable 80. Secured to each of the shafts 36 near the ends thereof are members 45 which members extend substantially upwardly from said shafts 36, and the upper ends of all of said members 45, with the exception of the extreme right hand pair of such members, has secured thereto, or formed integral therewith, extensions or stops 46 which, when the rectangular frame comprised of the members 32 and 33 is in its upward position as shown in Fig. 2, brings the upper end of the stops 46 into a position adjacent to, but slightly below, the plane in which lies the top of the top reach of the endless conveyer chains 16 and the bottom surface of the pallets 47, each of the pallets 47 containing the plurality of brick 48. The extreme right hand end pair of members 45 on the right hand shaft 36 have secured to the top, or formed integral therewith, upwardly extending members 49, the upper end of such members 49 being drilled at 50 to receive for sliding movement therein pins 51, the upper end of the members 49 being slotted at 52 to receive a pin 53 extending transversely of the pins 51 and thereby limit both the inward and outward movement of the pins 51. Between the inner or lower end of the pins 51 and the bottom of the drilled portion 50 is placed a compressing spring 54 which tends to maintain each of the pins 51 in its upward position. The distance from the center of the shaft 36 to the upper end of the pins 51 is greater than the distance from the center of the shafts to the upper ends of the stops 46 so that, when the rectangular frame comprised of the members 32 and 33 is in its upward position, as shown in Fig. 2, the pins 51 will lie above the plane passing through the top of the top reach of the endless conveyer chains 16 and in position to be engaged by the oncoming stream of loaded pallets 47. Secured to the extreme right hand end of the frame members 32 are stops 55, the upper ends of which lie in substantially the same horizontal plane as lie the upper ends of the pins 51.

Secured to the side members 13, spaced apart from, and parallel to each other, are shafts 56 and 57, and rotatably mounted on the shaft 57 is a substantially U shaped frame 58 to the ends of the portion joining the legs thereof is secured upwardly extending stop fingers 59, and rotatably mounted at the ends of the arms of the U shaped member 58 is a shaft 60. Secured to each end of the shaft 60 are levers 61 which are each provided with elongated slots 62 at a point intermediate their ends and through which slots extends the shaft 56, while rotatably mounted at the ends of each of the levers 61 is a roller 63, this last described mechanism operating as a combined stop, alining, and releasing device for the oncoming stream of loaded pallets 47 as they are fed onto the storage conveyer from the drying apparatus.

Assuming that the apparatus is constructed as above described and that loaded pallets 47 are being fed to the storage conveyer from the left hand end thereof, it will be evident that, as a loaded pallet 47 moves onto the storage conveyer, such pallet will be carried by the conveyer chains 16 into engagement with the rollers 63 and the weight of the pallet with its load of bricks 48 will depress such rollers 63 about the pivotal point 62 of the levers 61 simultaneously depressing the stop fingers 59 which, however, immediately return to their normal or upward position, as shown in Fig. 2, when the loaded pallet has passed beyond the roller 63. Simultaneously with the return of the stop fingers 59 to normal position, the rollers 63 also return to a normal position, and the loaded pallet 47 will be brought to rest against the stop fingers 59. Should the loaded pallet 47 have been delivered to the conveyer chains 16 with one end further advanced than the other, the engagement of the loaded pallet by the stop fingers will correct such disalinement and the loaded pallet, when released, will be given a fair start over the conveyer chains 16. The next succeeding pallet 47, with its load of bricks 48, will, in like manner, depress the rollers 63 simultaneously depressing the stop fingers 59 which thereupon release the first of said pallets 47 and said pallet will therefore, be moved to the right by the conveyer chains 16, this movement being continued indefinitely. It is assumed that the operating rod 28 has been moved to the right against the tension of the spring 29 and that, therefore, the rectangular frame comprised of the members 32 and 33 is in its downward position, thereby maintaining all of the stop fingers 46, the stop fingers 51, and the stop members 55 out of possible engagement with the oncoming stream of pallets 47 so that, under normal conditions of the device with which the present invention is adapted to function, the conveyer chains 16 act merely as conveying chains.

Should, for any reason, the mechanism with which the present invention is adapted to function, be deranged or if, for any reason, such mechanism is unable to properly take care of any more loaded pallets 47, the operating rod 28 is released, whereupon the spring 29 moves such operating rod 28 to the left, thereby causing an upward movement of the horizontal rectangular frame comprised of the members 32 and 33 and bringing the stops 46 into operative position with relation to the pallets 47 and also bringing the stop pins 51 and stops 55 into such a position as to engage the pallets 47. The pins 51 are, in reality, safety stop pins and are constructed as above described so that, if, at the time the rectangular frame is moved upwardly by the spring 29, a pallet 47 should be above the upper ends of the pins 51, such pins will move downwardly under the weight of the pallet and its load against the tension of the spring 54 and said pallet will be moved forwardly by the conveyer chains 16 and will be brought positively to rest by engaging with the stops 55. The next succeeding pallet 47 will be brought to rest in the position shown in Fig. 2 by the pins 51. Normally the stop pins 46 in the downward position of the rectangular frame will be in the position shown in dot and dash lines in Fig. 5, and when the rectangular frame has been moved to its uppermost position, the stops 46 will be in the position shown in dotted lines in Fig. 5. In the uppermost position of the stop fingers 51 which will correspond with the dotted position of the stop fingers 46, as shown in Fig. 5, the upper ends will be in position to engage with the oncoming pallet 47 and such pallet, in its onward movement, will swing the pins 51 from the inclined position shown in Fig. 5 to a vertical position, as shown in Fig. 2. The chain 40 attached to the upper end of the arm 38 of the extreme right hand bell crank lever, comprised of the arms 37 and 38, is so proportioned that movement from the inclined position shown in Fig. 5 to the vertical position will move the first or right hand pair of stops 46 from the inclined position shown in Fig. 5 to the intermediate inclined position designated by the numeral 57 in Fig. 5 and in position to be engaged by the next succeeding loaded pallet 47 which, being carried to the right by conveyer chains 16, will move the first pair of stops 46 into the upright position, as shown in Fig. 5, the chain 40 connected to the bell crank lever associated with such first pair of stops 46 moving the next pair of stops 46 to the position indicated by 57 in Fig. 5, this sequence of operations being continued until the last stop finger is moved to the intermediate position. As such last pair of stops 46 moves to the upright position, as shown in Fig. 5, the chain 41 attached to the free end of the arm 38 pulls the switch blades 42 out of engagement with the cooperating contacts thereof on the switch 43 breaking, in this manner, the power circuit leading to the motor 81 that operates the device for feeding the loaded pallets 47 onto the conveyer chains 46. The distance between the pallets as they are fed onto the conveyer chains 16 is approximately two feet so that the next succeeding pallet after the one engaging the extreme left hand pair of stop fingers 46 will come into engagement with, and be stopped by, the fingers 59 and the next succeeding pallet after the one now in engagement with the fingers 59 will be retained on the feeding mechanism operated by the motor controlled by the switch 43 so that, assuming the mechanism at the right of the mechanism of the present invention to be still out of action, the mechanism forming the subject matter of the present invention will be held in the position shown in Figs. 1 and 2. When the mechanism to the right of that shown in Figs. 1 and 2 is again brought into action, the operating rod 28 is drawn to the right against the tension of the spring 29, causing a lowering of the rectangular frame comprised of the members 32 and 33 and this lowering pulls the stop fingers 46 and 51, as well as the stops 55, downward out of engagement with the pallets 47 allowing the stream of loaded pallets to move onward in the direction of the arrow and will slip by the pallets 47 when such pallets are retained in the position shown by the stop fingers.

While I have necessarily described my present invention as being adapted particularly for moving and storing up, in case of need, a plurality of pallets loaded with brick, and referred to above, it is obvious that I may employ my device for handling articles other than loaded pallets and I do not wish to limit myself to the transportation of this particular article other than as pointed out in the appended claims.

Having thus described my invention, what I claim as new is:

1. In an improved storage conveyer, the combination of a pair of conveyer chains running parallel to, and spaced apart from, each other, alining and release means associated with said conveyer chains at the entrance end thereof, and means for stopping a plurality of pallets in succession associated with said conveyer chains.

2. In an improved storage conveyer, the combination of a frame, endless conveyer chains mounted on each side thereof and extending parallel to each other, means for driving said conveyer chain continuously in one direction, means for alining articles to be transported located at the entrance end of said conveyer, releasing means associated with said alining means and operating to release a plurality of articles to be transported in succession, means for stopping said articles in succession, and means operable on the filling of the storage conveyer for preventing further feeding of articles thereto.

3. In an improved storage conveyer, the combination of an endless conveyer chain, means for driving the same, means associated with the conveyer for stopping a plurality of articles to be conveyed in succession and holding the same immovable while allowing the conveyer to be kept in motion, and means operable, when the conveyer is loaded to capacity, for stopping further movement thereof.

In testimony whereof, I have signed my name to this specification.

CLAUD E. FULLER.